United States Patent [19]

Bunse et al.

[11] Patent Number: 4,945,454

[45] Date of Patent: Jul. 31, 1990

[54] REFLECTOR FOR DIMMED OR DIMMABLE MOTOR VEHICLE HEADLIGHTS

[75] Inventors: Wolfgang Bunse, Bielefeld; Hans-Otto Ernst, Lippstadt; Heinz Droste, Erwitte; Franz-Josef Kalze, Harsewinkel; Wolfgang Peitz, Warstein, all of Fed. Rep. of Germany

[73] Assignee: Hella KG Hueck & Co., Lippstadt, Fed. Rep. of Germany

[21] Appl. No.: 321,826

[22] Filed: Mar. 9, 1989

[30] Foreign Application Priority Data

Mar. 11, 1988 [DE] Fed. Rep. of Germany ....... 3808086

[51] Int. Cl.[5] .............................................. B60Q 1/00

[52] U.S. Cl. ...................................... 362/61; 362/297; 362/346

[58] Field of Search ................... 362/61, 80, 297, 304, 362/307, 310, 346, 347

[56] References Cited

U.S. PATENT DOCUMENTS 4,772,988 9/1988 Brun ................................ 362/346 X

FOREIGN PATENT DOCUMENTS 2205610 8/1973 Fed. Rep. of Germany .

2644385 4/1978 Fed. Rep. of Germany .

*Primary Examiner*—Stephen F. Husar

*Attorney, Agent, or Firm*—Griffin, Branigan and Butler

[57] ABSTRACT

A reflector for a dimmed or dimmable motor vehicle headlight is divided into an asymmetrical wedge-shaped sector, an upper sector, and a lower sector which are stepped axially from on another. The reflection surface is thereby formed such that a desirable light distribution is achieved without a correcting lens in horizontal and vertical areas perpendicular to a middle axis of the headlight. The desired light distribution of the asymmetrical wedge-shape sector is such that a corresponding point of every reflected light-filament image of each arbitrary point of the asymmetrical wedge-shaped reflection surface is positioned immediately near a prescribed borderline, such as a legislatively mandated borderline.

19 Claims, 3 Drawing Sheets

REFLECTOR FOR DIMMED OR DIMMABLE MOTOR VEHICLE HEADLIGHTS

BACKGROUND OF THE INVENTION

This invention concerns a reflector for a dimmed or dimmable motor vehicle headlight whose reflector includes an asymmetrical wedge-shape sector, an upper sector and a lower sector and whose reflection surface is arranged such that a desired light distribution is achieved without a correcting lens.

Such a reflector is described in German Auslegeschrift No. 22 05 610. The reflection surface of the reflector described therein for dimmable or dimmed headlights includes an asymmetrical wedge-shaped sector, an upper sector and a lower sector. A horizontal cross section taken through a middle axis of the reflection surface has the shape of a hyperbola while a vertical cross section taken through the middle axis produces a parabola. With this arrangement, the reflection surface supposedly produces a desired light distribution without a correcting lens. However, only a general preshaping of a light bundle for a desired distribution is created by this known arrangement, but to actually achieve a desired light distribution the use of an optical, or correcting light transmissive shield or lens is still necessary. Such correcting light transmissive shields, or lenses, are expensive. The use of correcting light transmissive shields is sometimes difficult with motor vehicles for which light transmissive shields must be extremely curved or angled from the vertical and/or the driving direction.

German Offenlegungsschrift No. 26 44 385 describes a dimmable headlight in which a desired light distribution is reported to be achieved with a reflector without a correcting light transmissive shield, or lens. The shape of a reflective surface of the reflector, however, must be determined through a differential equation whose solutions are parabolic sectional cuts. The possibilities of producing a reflector using parabolic cross sectional cuts whose light distribution corresponds to a desired light distribution are limited. That is, for example, it is only possible to shift an individual light filament image relative to other light filament images in a direction perpendicular to the horizontal through a vertex.

Thus, this invention has the purpose of providing a reflector whose light distribution in horizontal and vertical zones perpendicular to a headlight or beam middle axis fully corresponds to a desired light distribution in which an optically active light transmissive shield, or lens, is unnecessary.

SUMMARY

According to principles of this invention, a reflection surface is arranged to have an asymmetrical wedge-shaped sector such that a corresponding point of every light-filament image of each arbitrary point of the reflection surface lines immediately near a prescribed borderline, such as a legislatively mandated borderline.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF A PREFERRED EMBODIMENT

Figure 1:
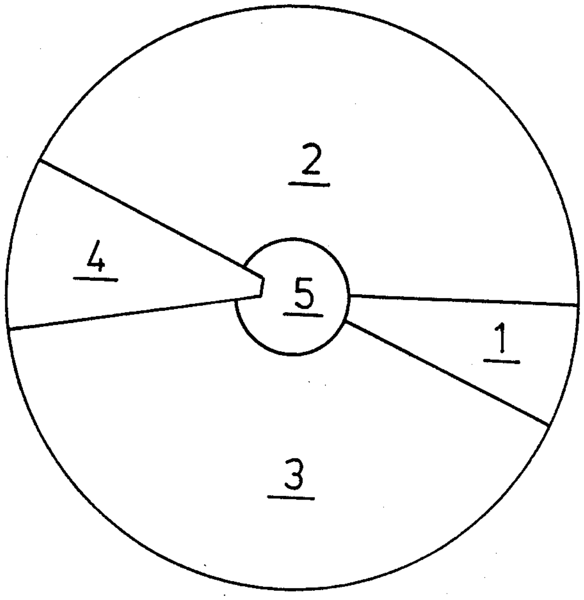
FIG. 1 is a plan view, partially schematic, into a reflector according to this invention.

In FIG. 1 a reflector according to this invention includes an asymmetrical wedged-shaped sector 1, an upper reflector sector 2, a lower reflector sector 3 and a transition, or opposite, reflector sector 4. The asymmetrical wedge-shape sector 1 and the transition sector 4 as well as the upper reflector sector 2 and the lower reflector sector 3 respectively lie opposite one another. In the middle of the sectors 1–4 is an opening 5 through which a normal glow lamp (not shown) with a filament, or the like, is inserted. It should be understood that the word filament as used herein means a source of light and is not limited to a coiled wire, although it could be a coiled wire.

The outer edge of the reflector of FIG. 1 is circularly shaped, however, the outer edge could be other shapes, such as rectangular. The positions and the measurements of the individual sectors 1–4, in particular those of the asymmetrical wedge-shape sector 1 and the transition sector 4, depend upon a respective legislatively prescribed, or mandated, bright-dark borderline for a prescribed light distribution to be met by light reflected from the inventive reflector on a screen positioned in front of the reflector. With the inventive reflector of FIG. 1, the arrangement and outer measurements meet the requirements of a German legislatively mandated borderline on the filing date of this application.

Figure 2:
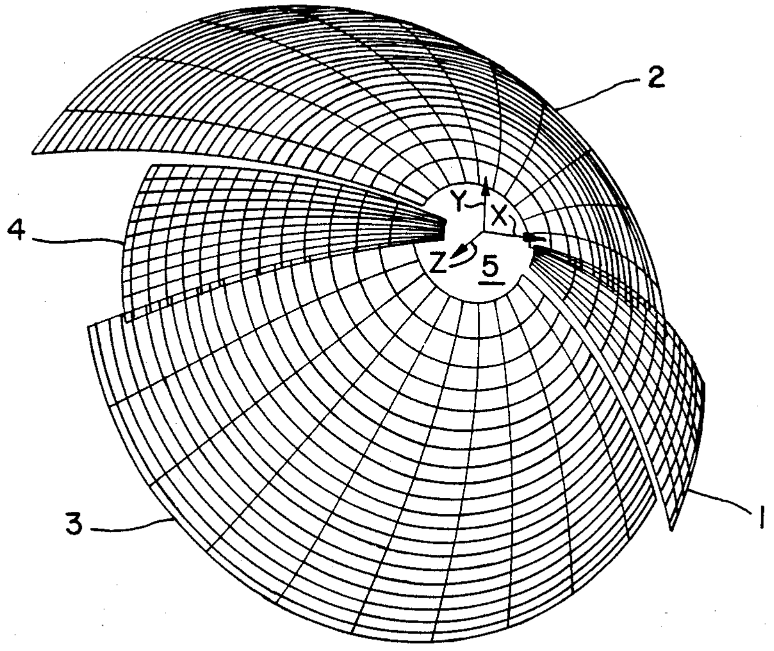
FIG. 2 is an isometric front view, taken at an angle, of the reflector of FIG. 1.

FIG. 2 shows an isometric, perspective, arrangement of the reflector sectors 1–4. One can recognize that the reflector according to FIGS. 1 and 2 displays definite axially displaced steps between reflector surfaces of the adjacent sectors. In this regard, a system of coordinates is included in FIG. 2 in order to clarify the three-dimensional relationships, with a first space direction X, a second space direction Y, and a third space direction Z being displayed. The representation of FIG. 1 lies in a plane parallel to a plane defined by the first and second space directions X and Y. The third space direction Z is the direction in which the reflector of this invention reflects light of a lamp positioned in the opening 5. The space direction Z is also the driving direction of a motor vehicle on which the reflector of this invention is mounted as a part of a motor vehicle headlight as well as being the middle axis of the headlight. The first and second space directions X and Y also define a plane to which an observer screen is parallel and on which the filament images of FIGS. 3-6 are arranged.

Figure 3:
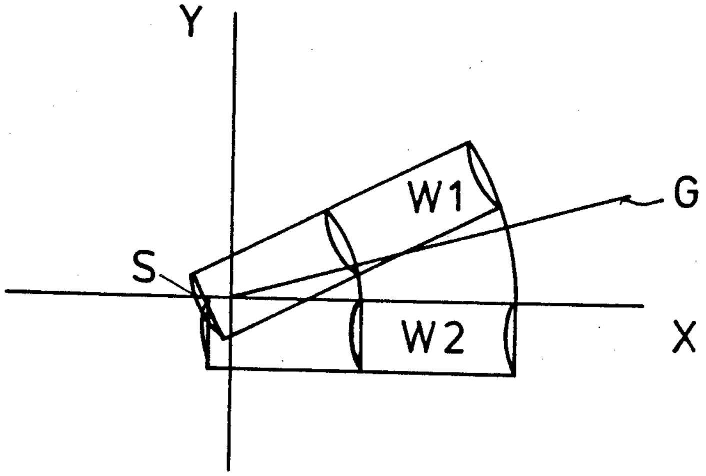
FIG. 3 is a schematic diagrammatic representation of an image of a lamp filament coil, reflected by an asymmetrical wedged-shaped sector of a reflector according to this invention on a screen positioned in front of the reflector.

The first and second space directions X and Y are also represented in FIG. 3. In addition, a German legislatively mandated bright-dark border G is also shown, which is characterized such that in FIG. 3, left of the second space direction Y the borderline G coincides with the first space direction X. Also, the borderline G forms a prescribed angle with the first space direction X on the right side of the second space direction Y.

In FIG. 3 a first filament image W1 and a second filament image W2 represent extreme, or border, filament images of a multiplicity of overlapping filament images reflected from the asymmetrical wedge shape sector 1 on the observation screen from the filament of the glow lamp (not shown). That is, between the first and second filament images W1 and W2 lie all the other overlapping reflected filament images of the asymmetrical wedge-shaped sector 1. The borders of the reflected images of the filament from the asymmetrical wedge-shaped sector 1 are defined by the first and second filament images W1 and W2 and the connecting lines drawn therebetween.

It is evident from FIG. 3 that the shape of the reflection surface of the asymetrical wedge-shaped sector 1 is such that a corresponding point in every reflected light-filment image of each arbitrary point thereof is immediately near the German legislatively mandate borderline. In the case of FIG. 3 each such point of the filament images lies along a prescribed stretch or line running substantially parallel to a Vertical plane passing through the middle axis immediately near to the German mandated borderline. End points S of this elongated stretch are determined by the first and second filament images W1 and W2. Because of the arrangement of the asymmetrical wedge-shaped sector 1, it contributes, as planned, to illumination of a right edge of a driving lane extending from the middle of the motor vehicle's driving lane.

Figure 4:
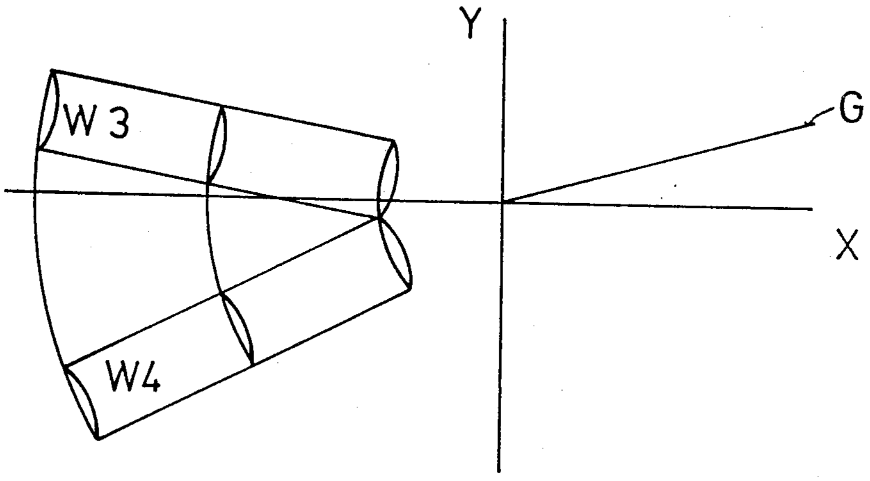
FIG. 4 is diagrammatic view of the type shown in FIG. 3 of the same lamp filament on the same screen reflected by a transition sector of the reflector according to this invention.

FIG. 4 shows the same type of diagram as does FIG. 3 with the same reference characters being provided thereon. Here representative of the many reflected filament images, are a third filament image W3 and a fourth filament image W4, which, together with connecting lines between these two filament images W3 and W4, define a border in which filament images are created by a reflective surface of the transition sector 4 on the observer screen.

One can recognize that the transition sector 4 is arranged such that every reflected light-filament image of each arbitrary point of the transition-sector reflection surface overlaps greatly with other reflected light-filament images and lies immediately near the legislatively mandated borderline G. With this additional characteristic the reflector of this invention can illuminate the driving lane of a motor vehicle in distant areas in front of the motor vehicle in the direction of the middle axis (space direction Z) of the headlight with a high density of light. On the other hand, it is possible to have a uniform measurement of light density from the middle of the driving lane, as is defined by the intersection of the first space direction X and the second space direction Y, to a left driving lane edge, that is to the left of the intersection in FIG. 4. The transition sector 4 contributes substantially to illumination of this area from the driving lane middle to the left driving lane edge whereby, arranging the third filament image W3 substantially on the legislatively mandated borderline G, an unduly, and legislatively forbidden, blinding of opposite traffic can be avoided.

Figure 5:
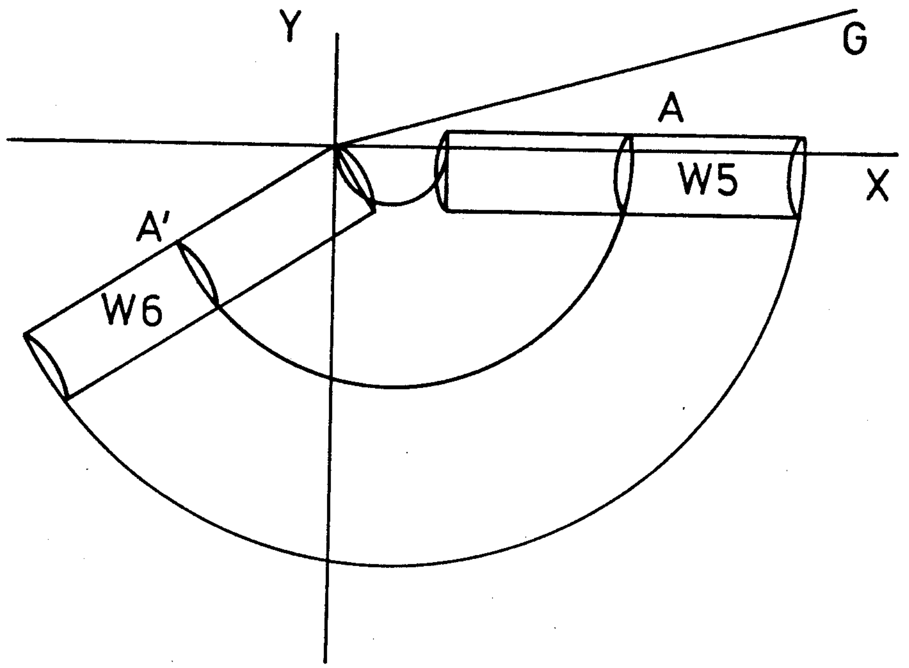
FIG. 5 is a diagrammatic view of the type shown in FIGS. 3 and 4 of the same lamp filament reflected off of a reflective surface of an upper sector of the reflector according to this invention.

FIG. 5 shows a similar diagram as in FIGS. 3 and 4 with the same reference characters as in FIGS. 3 and 4 being provided. In addition, a fifth filament image W5 and a sixth filament image W6 are represented in FIG. 5 that, together with connecting lines between these images W5 and W6, show the border of the many filament images reflected on the observer screen from the upper reflector sector 2.

One can recognize that the upper reflector sector is arranged such that every filament image of an arbitrary point of the upper reflector sector reflecting surface, particularly the represented reflected filament images W5 and W6, lie immediately near the borderline G mandated legislatively in Germany and that angles of the long axes A and A' of the filament images W5 and W6 deviate very little from the horizontal along the first space direction X. One must keep in mind that because of physical laws of reflection it is not possible to achieve a rotation of the filament images about a point, such as the intersection of the first and second space directions X and Y, even for the reflector of this invention. It is true, however, that with a reflector of this invention it can be assured that the long axes A and A' of the filament images W5 and W6 deviate very little from the horizontal, that is the space direction X. With the arrangement of the upper reflector 2 of this invention it is possible to illuminate the entire width of a driving lane of a motor vehicle with uniform light density, because the filament images in the area of a middle vertical, passing through the second space direction Y, overlap to a lesser extent than those in areas away from the middle vertical, that is, along space direction X. At the same time, with this arrangement, a generally uniform illumination of the driving lane in an area near the motor vehicle headlights, extending almost to the horizontal, a distance from the motor vehicle, is achieved. Through this inventive arrangement of the upper reflector 2 an increase of overall light perception is achieved, in comparison with known light systems, by the upper reflector sector 2.

Figure 6:
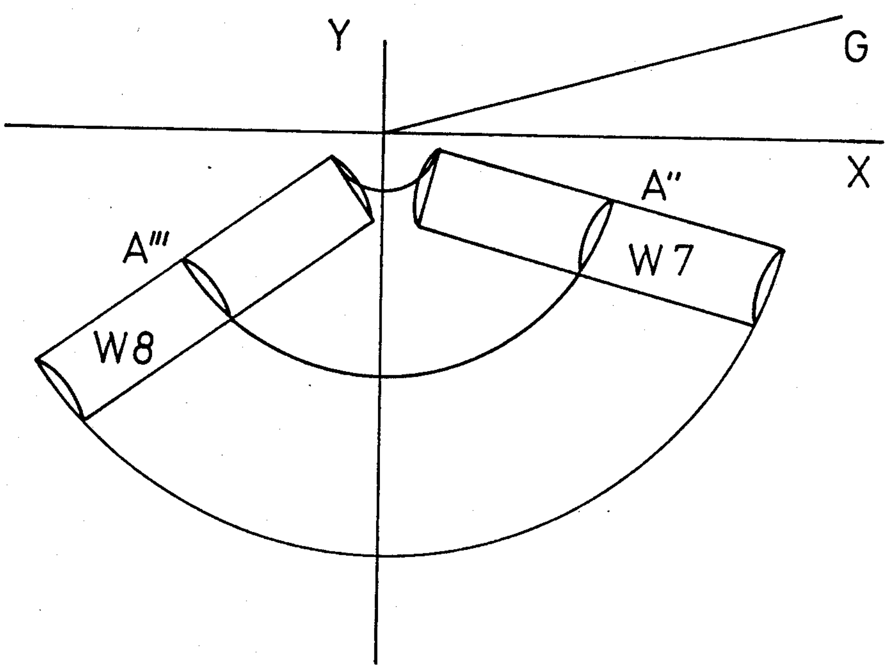
FIG. 6 depicts images of the same lamp filament on the same screen reflected by the surface of a lower sector of the reflector according to this invention.

FIG. 6 depicts a similar drawing arrangement as in FIGS. 3-5 with the same reference characters as in FIGS. 3-5 being provided. At the same time a seventh filament image W7 and an eighth W8 are represented in FIG. 6. The filament images W7 and W8, along with the connecting lines of FIG. 6, represent the borders of an area in which a multiplicity of filament images from a lower reflector sector 3 appear. In prior art headlights this lower reflector sector 3 is practically useless for illumination of a driving lane in which a motor vehicle is located because when constructing a reflector out of mathematically regular surfaces, and without axially-displaced steps between reflector sectors as in this invention, the filament images reflected from the lower reflector sector lie substantially above the legislatively mandated bright-dark borderline G. It has often followed that radiation from a lower reflector sector in commonly used headlights has to be reduced through appropriate shading or through the use of expensive correction with a light transmissive shield or lens that must bend the filament images reflected from the lower sector to be below the bright-dark border G. Both measures lead to a clear loss in headlight illumination intensity. When a light bundle reflected from a lower reflector surface is influenced through a correcting lens the tilt and curvature of the correcting lens is limited in order to avoid unduly large losses of light intensity and to avoid the creation of large amounts of defused light.

Through the particular arrangement of the lower reflector sector 3 in the reflector of this invention reflections of the filament image, particularly the seventh filament image W7 and the eighth filament image W8, are only in an area beneath the legislatively mandated borderline G and, indeed, in an arrangement that every reflected light-filament image of each arbitrary point of the reflector surface lies immediately near the legislatively mandated borderline and that angles of the long axes A″ and A‴ of the filament images W7 and W8 deviate very little from the horizontal. This achieves the benefits already described in relation to FIG. 5.

It is important that the lower reflector sector 3 of this invention contributes to illumination of the motor vehicle travel lane without substantial loss because of correcting measures involving a light transmissive shields or enclosing covers.

It will be understood by those of ordinary skill in the art that because of the arrangement of the reflection surface of the asymmetrical wedge-shaped sector it is possible to stay within the legal requirements to avoid blinding opposite traffic while achieving a complete illumination of a driving lane, in particular of the right side of the driving lane. In relation to the prior art, the invention has the advantage that by completely avoiding use of mathematically regular surfaces, such as parabolic and hyperbolic surfaces, for the shape of the reflection surface of the wedge shaped sector, the light distribution can correspond to a desired light distribution so that an optically effective light transmissive shield, or lens, is completely unnecessary. The tilts and curvatures of light transmissive shields of prior art headlights have limitations not found in headlights equipped with reflectors of this invention. A plain parallel glass plate can be used as a light transmissive shield which is different from prior art optical corrective shields. Thus, the headlights of this invention are less expensive to construct than prior art headlights.

An advantage that can be achieved with this invention is that a corresponding point of every reflected light-filament image of each arbitrary point of a reflection surface can be positioned at a preselected point immediately near a legislatively mandated borderline so that as one goes away from the preselected point a lessening of the light density is achieved in proportion to the distance from the preselected point. In this manner, light density can be concentrated in the middle of a driving lane.

It is also advantageous for a corresponding point of every reflected light-filament image of each arbitrary point of a reflection surface to be positioned along a prescribed stretch parallel to a vertical plane passing through the middle axis immediately near a legislatively mandated borderline to, for example, concentrate light density on the middle of a driving lane and at the same time with the asymmetrical wedge-shaped reflector to uniformly illuminate the distant area in front of a motor vehicle. The same purpose is fulfilled when a corresponding point of every reflected light-filament image of each arbitrary point of a reflection surface is positioned in a prescribed zone immediately near a borderline such a legislatively mandated borderline.

In this regard, it is particularly advantageous if the prescribed point, line, or zone is immediately near a legislatively mandated point R 75. The point R 75 is 75 meters from the reflector of a motor vehicle and directed on the right side of a driving lane. Particularly intensive and uniform illumination can be achieved in this manner around point R 75.

It is advantageous if the shape of the reflection surface in a transition sector between an upper sector and a lower sector is arranged such that every reflected light-filament image of each arbitrary point overlaps to a great extent with other light-filament images and lies immediately near the legislatively prescribed borderline. Through this additional characteristic of the reflector of this invention one side of a driving lane can be illuminated with a high intensity at a distant area in front of the motor vehicle in the direction of the middle axis. In addition, with these means it is possible to achieve a uniform measurement of light density from the middle of the driving lane to a left edge of the driving lane.

If a closing door, or cover, of a headlight is tilted to a great extent it is advantageous to arrange the shape of the reflection surface of the transition sector such that every reflected light-filament image of each arbitrary point thereof overlaps very little with other light-filament images and lie immediately near the legislatively mandated borderline. By this means a bend in the left horizontal portion of the borderline, that is created by the reflector together with the closing door, or cover, as opposed to a legislatively mandated borderline, is effectively prevented.

In this regard, the transition sector can be inset, or stepped down in the middle axis direction, from the upper sector and the lower sector and the asymmetrical wedge-shaped sector can be arranged in the opposite position. In this manner, the surface shape of the reflection surface of the transition sector can be selected independently of the surface shape of the reflection surface of the upper sector and the lower sector. Thus, in this manner, there are steps in an axial, or Z, direction at the interfaces between the sectors. The advantageous arrangement of this invention leads overall to a four part division of the inventive reflector.

Further in this regard, it is advantageous to arrange the transition sector in a parabolic form because this is uncomplicated and inexpensive and because, in this case, the filament images overlap to the greatest possible extent. However there are other possible arrangements of the reflection surface of the transition sector.

Finally, it is particularly advantageous to form the reflection surfaces for those sectors other than the transition sector and the asymmetrical wedge-shaped sector such that every filament image from an arbitrary point in the reflection surface is immediately near a legislatively mandated borderline and such that an angle of a length axis of the filament image deviates very little from the horizontal. Through this additional characteristic it is possible to shape the reflector of this invention so that the entire driving lane width is illuminated with uniform light density while the filament images in the area of the middle vertical overlap to a lesser degree than in the areas away from the middle vertical. At the same time, through this means a uniform illumination of the driving lane immediately in front of a motor vehicle headlight to a distance near the horizontal, far from the motor vehicle headlight, is achieved.

The embodiments of the invention in which an exclusive property or privilege are claimed are defined as follows:

1. A reflector for a dimmed or dimmable motor vehicle headlight, said reflector comprising a reflection surface for producing a beam of light in front of said headlight including an asymmetrical wedge-shaped sector, an upper sector, and a lower sector, the reflection surface being formed such that a desired reflected light distribution is created without a correcting lens, the asymmetrical wedge-shaped sector not having a parabolic shape but being arranged such that a corresponding point of every reflected light-filament image of each arbitrary point of the asymmetrical wedge-shaped sector lies immediately near a light-dark borderline for a prescribed light distribution produced by said reflective surface in front of said headlight, such as a legislatively mandated borderline.

2. A reflector according to claim 1, wherein said corresponding point of every reflected filament image of each arbitrary point of the asymmetrical wedge-shaped sector reflection surface is approximately at a preselected point immediately near said borderline.

3. A reflector as in claim 2, wherein the preselected point is immediately near said legislatively mandated point at R 75, which is 75 meters in front of said reflective surface tending toward the right.

4. A reflector as in claim 1, wherein said corresponding point of every reflected filament image of each arbitrary point of the asymmetrical wedge-shaped sector lies along a stretch running substantially parallel to a vertical plane passing through a middle axis near said borderline.

5. A reflector as in claim 4, wherein the prescribed stretch is immediately near said legislatively mandated point at R 75, which is 75 meters in front of said reflective surface, tending toward the right.

6. A reflector according to claim 1, wherein said corresponding point of every reflected filament image of each arbitrary point of the asymmetrical wedge-shaped sector lies in a preselected zone immediately near said borderline.

7. A reflector as in claim 6, wherein the preselected zone is immediately near said legislatively mandated point at R75, which is 75 meters in front of said reflective surface, tending toward the right.

8. A reflector as in claim 1, wherein the reflection surface includes a transition sector between the upper sector and the lower sector and wherein the transition sector is arranged such that every reflected filament image of each arbitrary point of the transition sector overlaps greatly with other filament images and is immediately near said borderline.

9. A reflector according to claim 8, wherein the transition sector is stepped away from the upper and lower sectors.

10. A reflector as in claim 8, wherein the transition sector has a parabolic shape.

11. A reflector as in claim 8, wherein the arrangements of the transition and the asymmetrical wedge-shape sectors are such that every reflected light-filament image of each arbitrary point of such sectors is immediately near the borderline such that angles of axes of elongations of the filament images thereof deviate very little from the horizontal.

12. A reflector according to claim 1, wherein a transition sector of the upper sector and the lower sector is arranged such that every reflected filament image of each arbitrary point thereof overlaps very little with other reflected filament images and is immediately near said borderline.

13. A reflector according to claim 12, wherein the transition sector is stepped away from the upper and lower sectors.

14. A reflector as in claim 12, wherein the arrangements of the sectors other than the transition and the asymmetrical wedge-shaped sectors are such that every reflected light-filament image of each arbitrary point of such sectors is immediately near the borderline and that an angle of an axis of elongation of a filament image deviates very little from the horizontal.

15. A reflector according to claim 1 wherein at least one of the sectors is stepped away in a direction of beam axis from an adjacent sector.

16. A reflector according to claim 1 wherein all of the sectors are stepped away in a direction of beam axis from all adjacent sectors.

17. A reflector according to claim 1 wherein the asymmetrical wedge shaped sector is stepped away in a direction of beam axis from one of adjacent sectors.

18. A reflector according to claim 17 wherein the asymmetrical wedge shaped sector is stepped away in a direction of beam axis from both adjacent sectors.

19. A reflector according to claim 1 wherein the asymmetrical wedge shaped sector does not have a mathematically regular shape.

* * * * *